United States Patent
Mercier

[15] 3,640,172
[45] Feb. 8, 1972

[54] LOCKING RING FOR PRESSURE VESSEL

[72] Inventor: Jacques H. Mercier, 49 Rue de Naples, Paris, France

[22] Filed: May 7, 1969

[21] Appl. No.: 822,445

Related U.S. Application Data

[62] Division of Ser. No. 613,660, Feb. 2, 1967, Pat. No. 3,537,481.

[52] U.S. Cl. .............................. 85/8.8, 285/208, 277/178, 138/30
[51] Int. Cl. ............................................... F16b 21/00
[58] Field of Search .............. 85/8.8, 8.6; 287/136; 285/208; 138/30; 277/178

[56] References Cited

UNITED STATES PATENTS 2,936,787   5/1960   Mercier ........................... 285/208

FOREIGN PATENTS OR APPLICATIONS 628,853   6/1963   Belgium ............................. 285/208

Primary Examiner—Marion Parsons, Jr.
Attorney—Arthur B. Colvin

[57] ABSTRACT

This invention relates to a locking ring for the closure plug of a pressure vessel for storing fluid under pressure and particularly of the type having a deformable partition such as a bladder therein. The closure plug has a flanged inner end of diameter slightly less than the diameter of the port of the pressure vessel into which it is to be inserted and the locking ring normally is of greater diameter than said port and is foldable for insertion through said port so that it may then be restored to its original shape to encompass the closure plug and restrain outward movement thereof from such port.

3 Claims, 7 Drawing Figures

PATENTED FEB 8 1972

3,640,172

INVENTOR
Jacques H. Mercier
By Cecil L. Blouin
ATTORNEY

PATENTED FEB 8 1972

INVENTOR
Jacques H. Mercier
By Arthur B. Colvin
ATTORNEY

LOCKING RING FOR PRESSURE VESSEL

CROSS-REFERENCES TO RELATED APPLICATION

This application is a division of copending application Ser. No. 613,660, filed Feb. 2, 1967, now U.S. Pat. No. 3,537,481.

BACKGROUND OF THE INVENTION

1. Field of the Invention

This invention relates to a locking ring for the closure plug of a pressure vessel for storing fluid under pressure and particularly of the type having a deformable partition such as a bladder therein.

2. Description of Prior Art

As conducive to an understanding of the invention, it is noted that where a pressure container has an opening or port with a removable closure plug therein, the use of a threaded plug is undesirable in that the threads may become worn and stripped with likelihood of blowing out of the plug when high pressures are attained in the container. In addition, if such plug can be removed before substantially all of the pressure is relieved in the container, when the mechanic disassembling the container has partially released the plug, it may suddenly blow out and cause severe injury.

To overcome such difficulties, a plug may be utilized having a reduced neck defining a shoulder and forming an enlarged inner end portion of smaller outside diameter than the port so that it may be inserted therein. A locking member in the form of a ring encompassing the reduced neck portion of the plug, has an outer diameter greater than that of said port and an inner periphery overlapped by the shoulder of the enlarged end portion of the plug and is seated in position with rigid portions of the locking member intervening between the inner rim of the port and said shoulder. By means of any suitable retaining element, such as a nut screwed on the externally threaded neck of the plug, which protrudes from the port, the plug may be releasably yet securely affixed to said container. As the locking member is of greater diameter than the port, in order that it may be inserted therethrough into the container, it is made deformable as by having portions thereof relatively displaceable.

Where, to permit such deformation, the locking member is of resilient metal having one or more splits through the circumference thereof, such as a conventional split ring which may be of hardened spring steel, the pressure vessel bladder as it expands to expel liquid from the container, will come in contact with the portion of the surface of such ring which extends laterally outward from the shoulder of the plug and especially at high pressures, extrude through such split, thereby pinching or cutting the bladder with resultant destruction of the latter and failure of the pressure vessel.

In order to permit such deformation and provide a surface against which the pressure vessel bladder may abut which has no splits or discontinuities, as shown in U.S. Pat. Nos. 2,936,787 and 3,148,705, a locking member has been provided which comprises a plurality of arcuate segments arranged substantially in a ring, the adjacent ends of said segments being spaced from each other. The segments are desirably of hardened metal such as steel which will withstand the shearing action against the inner periphery of the locking member caused by the pressure on the enlarged end of the plug when the bladder is bearing thereon and the shearing action caused by the pressure of the locking member against the rim of the port. The segments are connected together by a resilient ring so as to be securely retained with respect thereto and so positioned that the top of the locking member will present an uninterrupted surface to the bladder, the resilient ring permitting relative displacement of portions of the locking member so that it may be deformed for insertion into the port, the locking member being self-restoring to its original shape.

Where the thickness of the resilient ring at the line of deformation or folding thereof for insertion is relatively great, such folding action will cause undue stress on the material of the resilient ring with resultant fatigue and possible tearing and consequent malfunctioning of the pressure vessel.

It is accordingly among the objects of the invention to provide an annular locking member and method of forming the same for use with a pressure vessel having a closure plug associated therewith, which locking member may readily be fabricated at relatively low cost and may readily be deformed for insertion into an opening of diameter less than the unfolded diameter of the locking member, which locking member will provide an uninterrupted resilient surface and may be folded and unfolded without fatigue of the material of the resilient portion thereof at the region of folding which would cause tearing and resultant inoperativeness.

SUMMARY OF INVENTION

In accordance with the invention, the closure plug is retained in position by a circular locking member which comprises joined rigid arcuate segments and a resilient ring. The resilient ring which extends over the rigid segments presents an uninterrupted top surface and the portion of the resilient ring extending from the top surface of the rigid segments below such top surface has slits therethrough aligned with the spaces between the ends of the segments.

BRIEF DESCRIPTION OF THE DRAWINGS

In the accompanying drawings in which are shown one or more of various possible embodiments of the several features of the invention.

DESCRIPTION OF THE PREFERRED EMBODIMENTS

Figure 1:
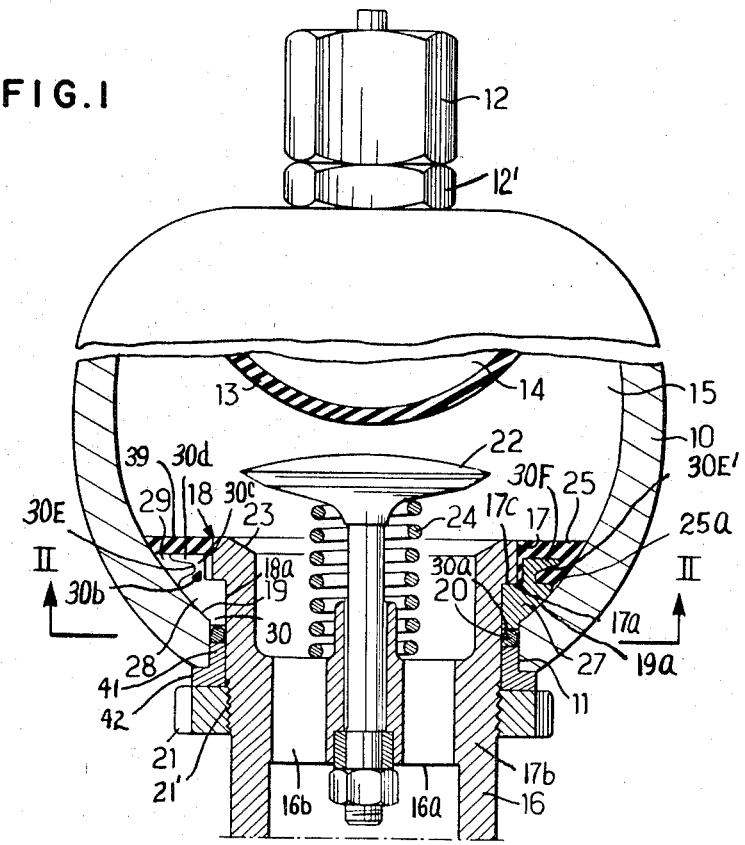
FIG. 1 is a longitudinal sectional view of a pressure vessel with parts broken away taken along line I—I of FIG. 2.

Referring now to the drawings, the locking member, according to the invention, is illustratively shown in FIG. 1 incorporated in a pressure vessel such as a pressure accumulator. This accumulator desirably comprises a rigid container 10 of material such as steel which is capable of withstanding high pressure.

The container has opposed ports, the upper port being designed to receive a standard pneumatic valve 12 and the lower port designated by the numeral 11 serving as a liquid port.

Positioned in the container in conventional manner is a deformable partition, illustratively a bladder 13, the latter desirably being of rubber either natural or synthetic and capable of expanding in order to force liquid from the container and defining a gas chamber 14 and a liquid chamber 15 on opposed sides thereof.

The port 11 desirably has a cylindrical outlet plug 16 positioned therein, the latter having a longitudinal bore therethrough and having a flange 17 at its inner end defining an annular shoulder 17a and a reduced neck portion 17b. The outer diameter of the flange is slightly less than the diameter of the port 11 so that is may readily be inserted therethrough and the neck 17b is of length such that it may protrude from port 11.

The plug 16 has a transverse wall 16a with passageways 16b therethrough and also has an axial bore through which extends the stem of a poppet valve 22 normally urged outwardly by coil spring 24, the periphery of valve 22 being designed to seat on the bevelled inner surface 23 of the bore of the plug.

The outlet plug 16 is affixed to the container 10 by a locking member 18 in the form of a ring constructed so that it may readily be deformed for insertion through port 11 into the container 10. As shown in FIGS. 1 to 4, for example, the locking member 18 comprises a resilient ring 25 and a plurality of arcuate segments, illustratively two in number and designated by the numerals 26, 27, preferably of hardened metal such as steel. Each of the segments is slightly less than 180° of arc so that when juxtaposed to form a ring, the adjacent ends a, b may be spaced from each other as at 28 as is clearly shown in FIG. 2, for example. The ring formed by such juxtaposed segments has an inner diameter shown at 18a in FIG. 1, but slightly larger than the outer diameter of neck 17b of plug 16 so that the inner wall 18a of said segments 26, 27 may snugly encompass neck 17b with the shoulder 17a of the plug 16 resting on the inner periphery 17c of said segments. The outer diameter of the ring formed by said juxtaposed segments 26, 27 is greater than that of the port 11 so that the oblique or bevelled portion 19a of the segments 26, 27 which conform generally to the shape of the inner surface 19 of the container 10 adjacent port 11 may seat thereon.

The undersurface of each of the segments 26, 27 adjacent the inner periphery thereof each has a cylindrical lower section defining an arcuate hub 30 of width substantially equal to the difference between the outer diameter of neck 17b and the diameter of port 11 so that said hub, when positioned between neck 17b and port 11 will center the plug 16 in said port 11.

More particularly, referring to FIG. 1, each of the segments 26, 27 comprises a flat lower face 30a, an outer side face having the arcuate lower section 30 which defines the hub, an intermediate section which defines the oblique or bevelled portion 19a and an arcuate upper section or rim 30b of larger diameter than section 30. The upper rim 30b is in the form of an inverted "L" with an upright portion 30c and a horizontal portion 30d directed outwardly with an arcuate groove 30e being defined beneath portion 30d. The upright portion 31 rises from the outer periphery of shoulder 17a and the inner wall 18a of each segment depends from the inner periphery of each shoulder 17c.

In the preferred embodiment of the invention herein illustratively shown, the segments 26, 27 are designed to be mounted in the resilient ring 25 so that they may be securely but releasably retained therein.

To this end, the lower surface of the ring 25 has a circular recess 30'e therein which is substantially L-shaped in cross section complementary to the rim portions 30b of the segments so that such rim portions may be securely but releasably accommodated in said groove 30'e.

When the arcuate segments 26, 27 are mounted in the resilient ring 25, the resultant locking member 18 will have the shape shown in FIG. 1, the resilient ring 25 having an oblique or bevelled periphery 25a which is designed to form an extension of the bevelled surface 19a of the segments.

Figure 2:
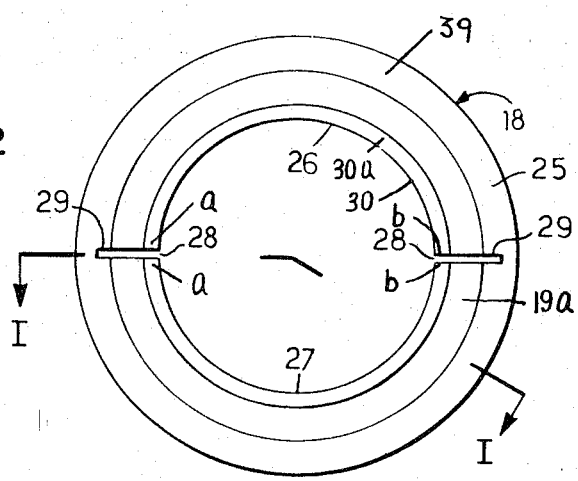
FIG. 2 is a transverse sectional view taken along line II—II of FIG. 1.
Figure 3:
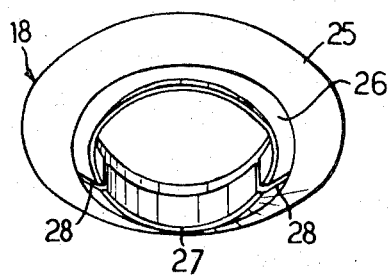
FIG. 3 is a perspective view of the locking member before formation of the slits in the resilient ring.
Figure 4:
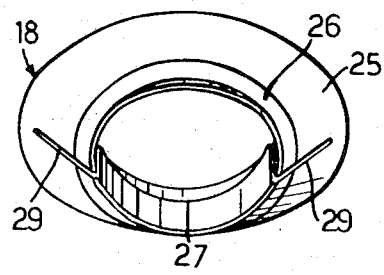
FIG. 4 is a view similar to FIG. 3 showing a locking member after the slits have been formed.

As shown in FIGS. 1, 2 and 4, the resilient ring 25 has a pair of diametrically opposed slits 29 therethrough which are aligned with the spaced 28 between the adjacent ends a—a and b—b of the segments. The slits 29 extend from the bottom edge of the resilient ring upwardly to a plane substantially aligned with the plane of the top surface 30f of the segments.

It is to be noted, referring to FIG. 1, that the width of the top surface 39 of the resilient ring 25 is such that when the locking member 18 is positioned in the container 10 such surface 39 will fill the space between the inner surface of the container adjacent the port 11 and the adjacent portion of the inner end of the plug 16. Consequently, since the slits 29 do not extend through the top surface 39 of the resilient ring, a substantially continuous surface will be provided which the expanding bladder 13 may contact during operation of the equipment.

In order to provide a liquidtight seal between the neck 17b of plug 16 and the wall surface of port 11, a resilient sealing ring 20, preferably an O-ring, encompasses the neck 17b between hub 30 and the reduced diameter portion 41 of a collar 42 which encompasses the neck 17b. A nut 21 screwed on the externally threaded portion 21' of neck 17b, when tightened, will securely retain the parts in assembled relationship.

In assembling the accumulator, the bladder 13 is passed through the port 11 of the empty container 10. The valve stem (not shown) secured to the bladder is pushed through an opening in the upper end of the container 10 and secured thereto by means of nut 12'. The plug 16 is then passed through the port 11 and the locking member 18 is deformed by being folded in two along a diametric line extending through the aligned spaces and slits 28, 29, such folding being permitted by the reason of the fact that the rigid arcuate segments 26, 27 are so spaced from each other.

The deformed locking member 18 may readily be passed through the port 11 into the container and it is then released. By reason of the resilience of the folded resilient ring 25, it will assume its original ringlike shape so that it may readily be passed around the neck portion 17b of the plug 16. The plug 16 can then be drawn outwardly until its shoulder 17c seats against the inner periphery 17a of the segments 26, 27 and the bevelled surface 19a of the segments seat on the inner surface 19 of container 10 about port 11. The sealing ring 20 and collar 42 may then be placed around the neck 17b and moved therealong until the ring 20 is against hub 30. The nut 21 is then screwed on neck 17b and tightened securely to retain the shoulder 17c of the plug against the inner periphery 17a of the segments and the undersurface of the segments against the inner surface of the container 10 about port 11, the O-ring 20 providing a dependable seal between the neck 17b and the wall of port 11.

By reason of the slits 29 in the lower portion of the resilient ring, the latter may readily be folded without tearing of the material of the resilient ring. Thus, due to the fact that the resilient ring 25 is relatively thick in cross section, when it is folded to permit insertion through the port 11, the material adjacent the fold line would normally be stretched considerably due to such thickness. However, by reason of the slits 29 which extend through the major portion of the thickness of the resilient ring, when the latter is folded, the material at the upper end 29' of the slits 29 will only stretch slightly thereby avoiding tearing thereof and enhancing the life of the sealing member 19.

It is also to be noted that the presence of the slits 29 does not weaken the resilient ring for in use the portion of the material adjacent the slits are not under tension, but when the expanded bladder presses against the upper surface 39 of the resilient ring it will tend to close the slits due to the elasticity of the ring.

In the embodiment shown in FIGS. 1 to 4, the resilient ring 25 and the arcuate segments 26 and 27 are formed separately as independent units and are then assembled, the slit 29 either being originally formed in the resilient ring 25 when it is molded, or cut therein as a separate operation. In such embodiment there is no bonding between the arcuate segments and the resilient ring. It is also within the scope of the invention to mold the arcuate segments and resilient ring in a single operation with the segments being spaced at 28 and with the slits 29 being formed during the molding operation.

Figure 5:
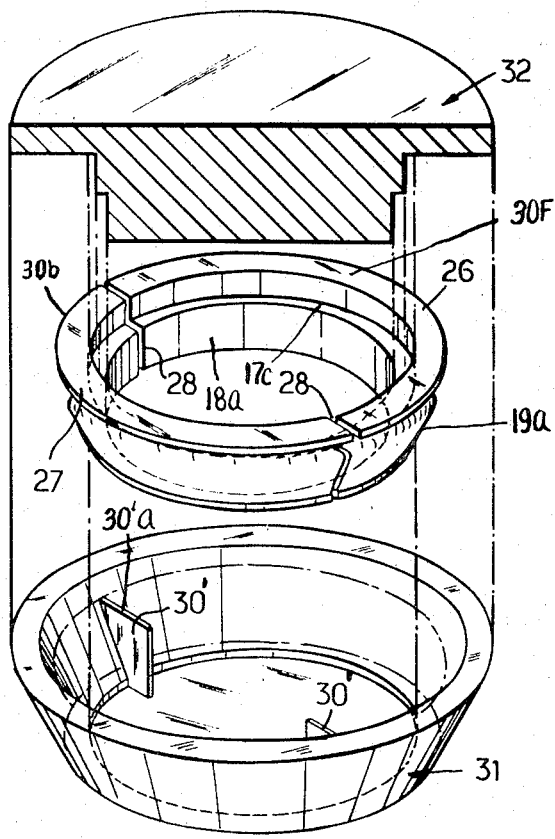
FIG. 5 is an exploded perspective view partly in cross section showing a method of forming the locking member according to another embodiment of the invention.
Figure 6:
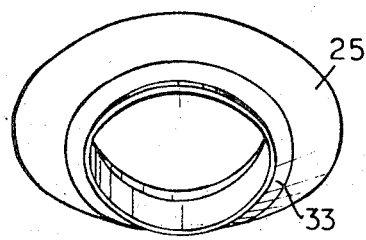
FIG. 6 is a perspective view of still another embodiment of the invention during fabrication thereof and utilizing a continuous circular rigid ring.
Figure 7:
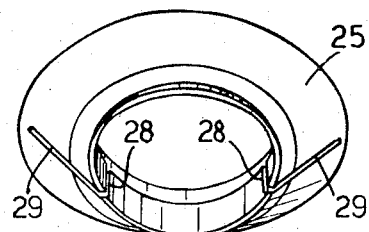
FIG. 7 is a view similar to FIG. 6 showing the locking member completed.

Thus, as shown in FIG. 5, a mold can be provided having a bottom portion 31 and a cover 32. The bottom portion of the mold is formed with diametrically opposed fins or separators 30' which are of height such that when the rigid segments 26, 27 are positioned in the bottom portion 31 spaced by fins 30', the upper edges 30'a of the fins 30' will extend slightly above the top surface 30f of each of the segments. Thus, when the molding operation is completed in conventional manner, the resultant resilient ring will have the segments molded therein with the spaces 28 and slits 29 formed as desired. It is also within the scope of the invention to form the locking member with a resilient ring and with a rigid ring 33, shown in FIG. 6 and thereupon to form the spaces 28 and slits 29 by sawing or cutting the locking member to a level above the top surface 30f of the rigid member thereby forming two separate arcuate segments.

With the construction above described, it is apparent that by reason of the fact that the thickness of the resilient ring at the fold line thereof has been materially reduced by reason of diametric slits 29, the locking member may readily be folded without undue strain on the material of the resilient ring adjacent the line of fold with resultant prevention of tearing of such resilient ring.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A foldable locking member comprising a ring of resilient material having a recess therein, said ring having an uninterrupted top surface, a plurality of rigid arcuate segments having conformations adapted to coact with the recess securely to retain the arcuate segments in the ring with their adjacent ends in juxtaposition defining a space therebetween, the outer periphery of said segments forming a continuation of the outer periphery of said resilient ring, with the top surface of said segments lying in a plane below the top surface of said resilient ring, the inner peripheries of said segments below the top walls thereof extending laterally inward beyond the inner periphery of said resilient ring to define an abutment shoulder, said outer periphery of said resilient ring having slits therethrough aligned with the spaces between said arcuate segments and extending from the lower edge of said resilient ring at least to a plane substantially aligned with the plane of the top surface of said arcuate segments.

2. The combination set forth in claim 1 in which said arcuate segments are releasably connected to said resilient ring.

3. The combination set forth in claim 1 in which said arcuate segments are bonded to said resilient ring.

* * * * *